United States Patent [19]

Kita

[11] Patent Number: 4,646,576
[45] Date of Patent: Mar. 3, 1987

[54] TORQUE DETECTOR
[75] Inventor: Toru Kita, Yokosuka, Japan
[73] Assignee: Nissan Motor Company, Limited, Japan
[21] Appl. No.: 735,591
[22] Filed: May 20, 1985
[30] Foreign Application Priority Data
  May 21, 1984 [JP]  Japan .................. 59-100659
[51] Int. Cl.⁴ .................................................. G01L 3/10
[52] U.S. Cl. ..................................... 73/862.36; 73/779
[58] Field of Search ............... 73/779, 862.36, 862.69, 73/DIG. 2; 324/209

[56]  References Cited
  U.S. PATENT DOCUMENTS
  2,912,642  11/1959  Dahle ........................... 73/DIG. 2

FOREIGN PATENT DOCUMENTS
  2060033  3/1973  Fed. Rep. of Germany .
  2435709  2/1976  Fed. Rep. of Germany .
  2951337  7/1980  Fed. Rep. of Germany .
  3031997  3/1982  Fed. Rep. of Germany .
  51-60580  5/1976  Japan .
  0708181  1/1980  U.S.S.R. ........................... 73/862.36

OTHER PUBLICATIONS
German Officia Action and English Translation.

Primary Examiner—Charles A. Ruehl
Attorney, Agent, or Firm—Leydig, Voit & Mayer

[57]  ABSTRACT

An a.c. generator is electrically connected to an exciting coil unit to supply alternating current to the exciting coil unit. A sensing coil unit is electromagnetically coupled to the exciting coil unit via ferromagnetic material of a shaft. An electrical signal induced across the sensing coil unit varies as a function of torque on the shaft. A balancing member electromagnetically coupled to the sensing coil unit includes a removable segment to zero-adjust the electrical signal when no torque is applied to the shaft.

10 Claims, 9 Drawing Figures

FIG. 7
FIG. 8
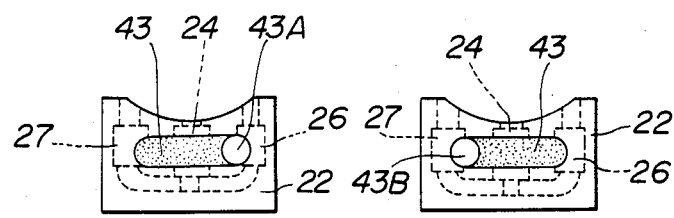
FIG. 9
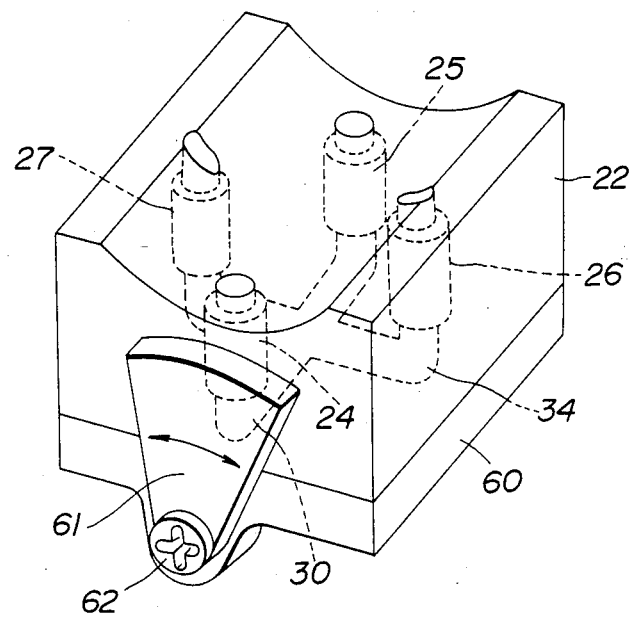

TORQUE DETECTOR

BACKGROUND OF THE INVENTION

1. Field of the Invention

This invention relates to a detector for measuring torque on a shaft, and in particular to a torque detector using magnetostriction.

2. Description of the Prior Art

Ferromagnetic materials exhibit magnetostriction. In a process of magnetostriction, when the ferromagnetic material is subjected to mechanical stress, magnetic properties of the material vary.

It is known to use magnetostriction in order to determine torque on a shaft.

Japanese patent publication 51-60580 discloses such a torque detector. In this detector, a shaft connecting a mechanical power source and a load is coated with a film of magnetic material. Torque on the shaft distorts the shaft, varying magnetic properties of the magnetic film. This magnetic variation is measured via a sensor including a pair of exciting coils and a pair of sensing coils disposed near the magnetic film and are electromagnetically coupled to each other via the magnetic film. When an alternating current flows through the exciting coils, an electrical signal induced across the sensing coils depends on the magnetic properties of the film and thus represents the torque on the shaft.

This torque detector includes a zero-adjusting arrangement to make its output zero when no torque is applied to the shaft. The zero-adjuster appears excessively sensitive, so that it seems not easy to handle the adjuster.

SUMMARY OF THE INVENTION

It is an object of this invention to provide a torque detector including an easily-operable zero-adjuster.

A torque detector of this invention includes an exciting coil unit and an a.c. generator electrically connected to the exciting coil unit to supply alternating current to the exciting coil unit. A sensing coil unit is electromagnetically coupled to the exciting coil unit via ferromagnetic material of a shaft. An electrical signal induced across the sensing coil unit varies as a function of torque on the shaft. A balancing member electromagnetically coupled to the sensing coil unit allows the electrical signal to be zero when no torque is applied to the shaft.

BRIEF DESCRIPTION OF THE DRAWINGS

FIGS. 7 and 8 are front views of the main body in which segments of the balancing member are removed.

FIG. 9 is a perspective view, similar to FIG. 3, of a main body and its base of a torque detector according to a second embodiment of this invention.

Corresponding elements are denoted by the same reference characters throughout the drawings.

DESCRIPTION OF THE PREFERRED EMBODIMENTS

Figure 1:
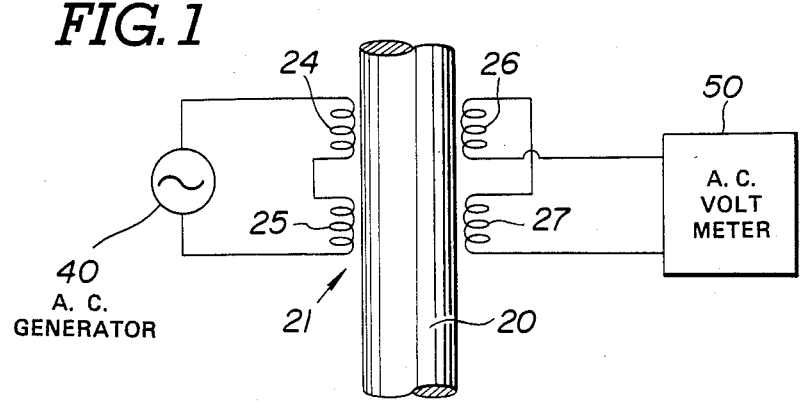
FIG. 1 is a schematic diagram of a torque detector according to a first embodiment of this invention.
Figure 2:
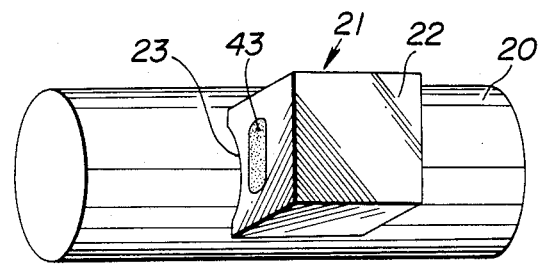
FIG. 2 is a perspective view of a shaft and a main body of the torque detector.

With reference to FIGS. 1 and 2, a rotatable shaft 20, such as an automotive steering shaft or an automotive transmission shaft, connects a mechanical power source (not shown) and a load (not shown). The shaft 20 is made of ferromagnetic material. As the shaft 20 is subjected to torque, it is distorted, varying its magnetic properties, such as magnetization and magnetic permeability, due to magnetostriction.

The shaft 20 may also include a non-ferromagnetic member coated with a film of ferromagnetic material.

A torque detector 21 associated with the shaft 20 measures torque on the shaft 20 by sensing magnetic permeability of the shaft 20. The torque detector 21 includes a fixed main body 22 generally made of plastic and disposed near the shaft 20. The main body 22 may be made of other electrically-insulating and non-magnetic materials. The main body 22 is formed with a recess 23 extending along the shaft 20 and having a curved surface conforming to part of peripheral surface of the shaft 20. Part of the shaft 20 is located in the recess 23 but is separated from the main body 22 by a preset clearance of about 1 to 2 millimeters.

Figure 3:
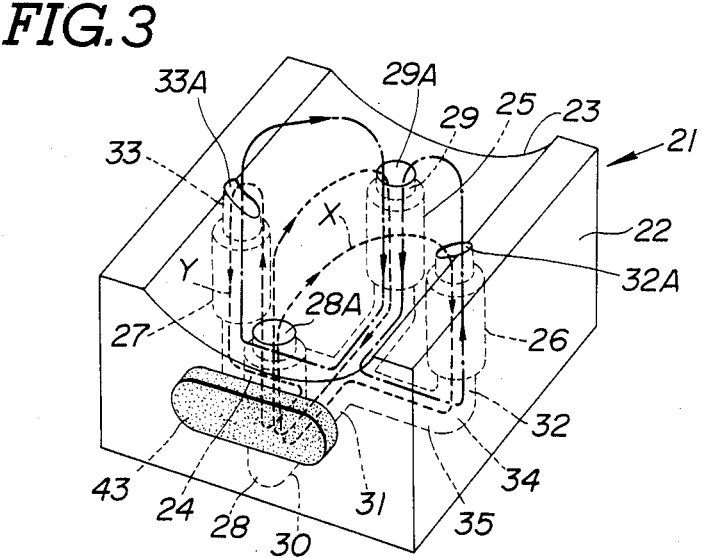
FIG. 3 is a perspective view of the main body in which internal structures of the main body are illustrated in phantom lines.

As shown in FIGS. 1 and 3, the torque detector 21 includes an exciting winding unit having a pair of exciting coils 24 and 25, and a sensing winding unit having a pair of sensing coils 26 and 27. The exciting coils 24 and 25 are wound on parallel arms 28 and 29 of a U-shaped core 30 respectively. The parallel arms 28 and 29 extend radially with respect to the shaft 20. The exciting core 30 has an arm 31 connecting the parallel arms 28 and 29 and extending parallel to the axis of the shaft 20. Accordingly, the exciting coils 24 and 25 separate in the axial direction with respect to the shaft 20. The combination of the exciting core 30 and the exciting coils 24 and 25 is generally embedded in the main body 22. The end faces 28A and 29A of the parallel arms 28 and 29 are exposed flush at the surface of the recess 23 and conform to the peripheral surface of the shaft 20.

The sensing coils 26 and 27 are wound on parallel arms 32 and 33 of a U-shaped core 34 respectively. The parallel arms 32 and 33 extend perpendicular to the axis of the shaft 20 and are mirror-symmetrical with respect to a plane including the central axis of the shaft 20. The sensing core 34 has an arm 35 connecting the parallel arms 32 and 33 and extending parpendicular to the connecting arm 31 of the exciting core 30. Accordingly, the sensing coils 26 and 27 separate essentially in the circumferential direction with respect to the shaft 20 and are symmetrical with respect to the combination of the exciting core 30 and the exciting coils 24 and 25. The combination of the sensing core 34 and the sensing coils 26 and 27 is generally embedded in the main body 22. The end faces 32A and 33A of the parallel arms 32 and 33 are exposed flush at the surface of the recess 23 and conform to the peripheral surface of the shaft 20.

It should be noted that the connecting arms 31 and 35 of the cores 30 and 34 are joined together at their centers.

As shown in FIG. 1, the exciting coils 24 and 25 are electrically connected in series. An a.c. generator 40 is electrically connected across the series combination of the exciting coils 24 and 25 via terminals (not shown) mounted on the main body 22. Since the sensing coils 26 and 27 are electromagnetically coupled to the exciting coils 24 and 25 via the cores 30 and 34, and the shaft 20, magnetic fluxes connecting the exciting coils 24 and 25, and the sensing coils 26 and 27 and inducing electrical signals across the sensing coils 26 and 27 are produced when the generator 40 allows alternating current to flow through the exciting coils 24 and 25. These magnetic fluxes are shown by the broken arrow lines in FIG. 3. It should be noted that directions of the magnetic fluxes reverse at the same frequency as the alternating current. Since the magnetic fluxes pass through the shaft 20, the electrical signals induced across the sensing coils 26 and 27 depend on the magnetic permeability of the shaft 20 and thus on the torque applied to the shaft 20.

The combination of the exciting coils 24 and 25 is designed so that in the sensing coil 26, the direction of magnetic flux connecting the exciting coil 24 and the sensing coil 26 is opposite to the direction of magnetic flux connecting the exciting coil 25 and the sensing coil 26 as shown in FIG. 3. This design allows the two magnetic fluxes to cancel, making zero an electrical signal induced across the sensing coil 26 if the magnetic fluxes completely balance. Similarly, in the sensing coil 27, the direction of magnetic flux connecting the exciting coil 24 and the sensing coil 27 is opposite to the direction of magnetic flux connecting the exciting coil 25 and the sensing coil 27 as shown in FIG. 3. Accordingly, an electrical signal induced across the sensing coil 27 is null if these magnetic fluxes completely balance.

As shown in FIG. 1, the sensing coils 26 and 27 are electrically connected in series in such a manner that respective torque-dependent variations in the electrical signals induced across these sensing coils 26 and 27 do not cancel, that is, additively join to form a resultant sensitively representing the torque on the shaft 20. An a.c. voltmeter 50 is electrically connected across the series combination of the sensing coils 26 and 27 via terminals (not shown) mounted on the main body 22. It should be noted that an amplifer may be electrically connected between the a.c. voltmeter 50 and the series combination of the sensing coils 26 and 27.

It is desirable that when no torque is applied to the shaft 20, cancellation of the magnetic fluxes passing through the sensing coil 26 or 27 is complete and the resultant electrical signal induced across the series combination of the sensing coils 26 and 27 is null. However, there are various imbalance factors, such as errors in positional settings of the coils 24, 25, 26, and 27 or errors in dimensions of cores 30 and 34, which adversely affect the nullification of the electrical signal across the series combination of the sensing coils 26 and 27 at the zero torque.

As best shown in FIG. 3, a balancing member 43 made of ferromagnetic material is embedded in the main body 22 near the exciting coil 24. This balancing member 43 is used to compensate for the above-mentioned imbalance factors in order to completely nullify the induced signal across the series combination of the sensing coils 26 and 27 when no torque is applied to the shaft 20.

The balancing member 43 extends generally parallel to the combination of the sensing coils 26 and 27, and the sensing core 34 and originally has a mirror-symmetrical shape with respect to the plane including both the central axes of the parallel arms 28 and 29 of the exciting core 30. One surface of the balancing member 43 is exposed at the surface of the main body 22 to allow access to the member 43.

After the torque detector 21 is manufactured and assembled, it is set into operation. Alternating current flowing through the exciting coils 24 and 25 develops magnetic fluxes running through the cores 30 and 34, and the shaft 20 as shown by the broken arrow lines in FIG. 3.

Figure 4:
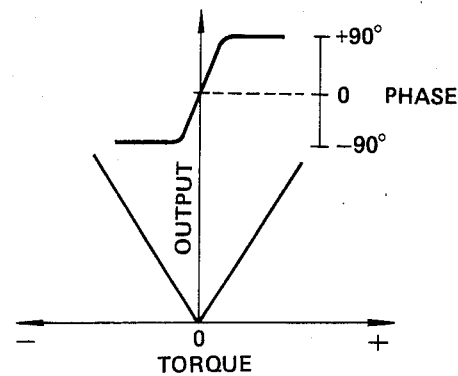
FIGS. 4 to 6 are graph of the relationship between torque on the shaft and voltage output of the torque detector, and also the relationship between torque on the shaft and phase of output of the torque detector in different three cases.

It is assumed that the torque detector 21, specifically coils and cores within the main body 22, is under balanced conditions without adjustment. FIG. 4 shows characteristics of the torque detector 21 in these balanced cases. As shown in FIG. 4, the amplitude of the output signal of the torque detector 21, that is, the amplitude of the resultant induced signal across the combination of the sensing coils 26 and 27, increases from zero linearly with the torque on the shaft 20 in a range of positive torque values. The amplitude of the output signal of the torque detector 21 decreases to zero linearly with the torque on the shaft 20 in a range of negative torque values. When the torque on the shaft 20 is zero, the amplitude of the output signal of the torque detector 21 is also zero. The inclinations of this characteristic line in the positive and negative torque ranges are opposite in sign but have the same absolute values. As shown in FIG. 4, the phase of the output signal of the torque detector 21 reverses by 180° around a point of zero torque, and is +90° in major part of the positive torque range and is −90° in major part of the negative torque range.

It is assumed that the torque detector 21 is under inbalanced conditions if no adjustment is performed. In some of these imbalanced cases, when no torque is applied to the shaft 20, the number of magnetic lines of flux X connecting the exciting coil 24 and the sensing coil 26 differs from the number of magnetic lines of flux Y connecting the exciting coil 24 and the sensing coil 27 while the number of magnetic lines of flux connecting the exciting coil 25 and the sensing coil 26 is essentially equal to the number of magnetic lines of flux connecting the exciting coil 25 and the sensing coil 27.

Figure 5:
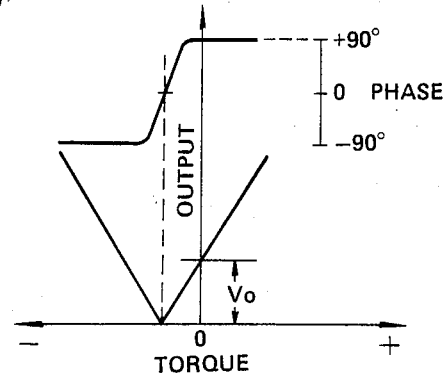

FIG. 5 shows characteristics of the torque detector 21 in certain imbalanced cases where the number of magnetic lines of flux X connecting the exciting coil 24 and the sensing coil is smaller than the number of magnetic lines of flux Y connecting the exciting coil 24 and the sensing coil 27 when no torque is applied to the shaft 20. As shown in FIG. 5, in these imbalanced cases, the value of torque on the shaft 20 at which the amplitude of the output signal of the torque detector 21 is zero shifts to a negative range with respect to the balanced cases of FIG. 4. When no torque is applied to the shaft 20, the amplitude Vo of the output signal of the torque detector 21 is not zero. In addition, when no torque is applied to the shaft 20, the phase of the output signal of the torque detector 21 shifts by +90° in comparison with the balanced cases of FIG. 4.

If the torque detector 21 is under imbalanced conditions of FIG. 5, a right-hand segment 43A of the balancing member 43 is removed as shown in FIG. 7 by using appropriate tools, such as a diamond drill to, in effect, vary the location of the electromagnetically interactive mass provided by the balancing member 43 in the flux coupling the exciting coil 24 and the sensing coil 26. This removal increases the number of magnetic lines of flux X connecting the exciting coil 24 and the sensing coil 26 and decreases the number of magnetic lines of flux Y connecting the exciting coil 24 and the sensing coil 27. This removal is performed to an extent such that the numbers of these fluxes X and Y are made equal and thereby the amplitude of the output signal of the torque detector 21 becomes zero when no torque is applied to the shaft 20. In this way, the imbalanced torque detector 21 is made balanced. As a result, the torque detector 21 has characteristics similar to those of FIG. 4.

Figure 6:
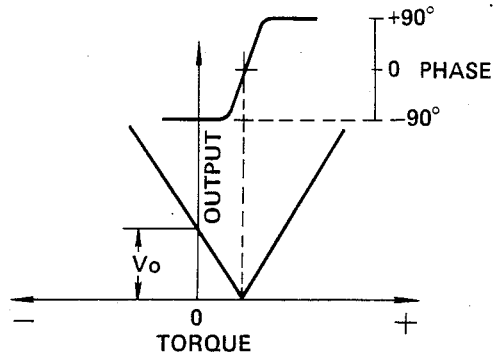

FIG. 6 shows characteristics of the torque detector 21 in other imbalanced cases where the number of magnetic lines of flux X connecting the exciting coil 24 and the sensing coil 26 is larger than the number of magnetic lines of flux Y connecting the exciting coil 24 and the sensing coil 27 when no torque is applied to the shaft 20. As shown in FIG. 6, in these imbalanced cases, the value of torque on the shaft 20 at which the amplitude of the output signal of the torque detector 21 is zero shifts to a positive range with respect to the balanced cases of FIG. 4. When no torque is applied to the shaft 20, the amplitude Vo of the output signal of the torque detector 21 is not zero. In addition, when no torque is applied to the shaft 20, the phase of the output signal of the torque detector 21 shifts by −90° in comparison with the balanced cases of FIG. 4.

If the torque detector 21 is under imbalanced conditions of FIG. 6, a left-hand segment 43B of the balancing member 43 is removed as shown in FIG. 8 in the same way as the preceding case. This removal decreases the number of magnetic lines of flux X connecting the exciting coil 24 and the sensing coil 26 and increases the number of magnetic lines of flux Y connecting the exciting coil 24 and the sensing coil 27. This removal is performed to an extent such that the numbers of these fluxes X and Y are made equal and thereby the amplitude of the output signal of the torque detector 21 becomes zero when no torque is applied to the shaft 20. In this way, the imbalanced torque detector 21 is made balanced. As a result, the torque detector 21 has characteristics similar to those of FIG. 4.

It should be noted that the balancing member 43 may also be an electromagnetically interactive mass made of electrically conductive material, such as copper or aluminum. In this case, eddy current flows in the balancing member 43 so that certain energy dissipates. Thus, the balancing member 43 interacts with the electromagnetic system of the torque detector 21 and hence affects the numbers of magnetic fluxes.

The balancing member 43 may also be located near the sensing coil 26. In this case, the balancing member 43 affects the number of magnetic lines of flux connecting the exciting coil 24 and the sensing coil 26 and also the number of magnetic lines of flux connecting the exciting coil 25 and the sensing coil 26. Removal of a segment of the balancing member 43 allows the amplitude of the output signal of the torque detector 21 to be zero when no torque is applied to the shaft 20.

The balancing member 43 may be attached to other surfaces of the main body 22, such as a surface opposite the surface having the recess 23.

FIG. 9 shows another embodiment of this invention. This embodiment is similar to the embodiment of FIGS. 1 to 8, except for the following design changes.

The main body 22 is mounted on a base 60. A balancing member 61 in a sector form has a narrow end connected to the base 60 by means of a bolt 62. When the bolt 62 is released, the balancing member 61 is free to pivot about the bolt 62 in a plane parallel to the combination of the sensing coils 26 and 27 and the sensing core 34. The axis of rotation of the balancing member 61 is in a plane including the central axis of the combination of the exciting coils 24 and 25 and the exciting core 30. The balancing member 61 is located near the exciting coil 24. As viewed in the axial direction with respect to the shaft 20 (see FIG. 2), major part the balancing member 61 moves to the right-hand or left-hand side of the exciting coil 24 in accordance with its rotation. As the balancing member 61 pivots, the location of the electromagnetically interactive mass provided by the balancing member 61 is varied and the number of magnetic lines of flux connecting the exciting coil 24 and the sensing coil 26 varies while the number of magnetic lines of flux connecting the exciting coil 24 and the sensing coil 27 varies oppositely. Accordingly, positional adjustment of the balancing member 61 allows the amplitude of the output signal of the torque detector 21 to be zero when no torque is applied to the shaft 20 (see FIG. 2). After the positional adjustment of the balancing member 61 is completed, the bolt 62 is fastened to fix the balancing member 61 in position. This zero adjustment is easier than the embodiment of FIGS. 1 to 8.

It should be noted that the balancing member 61 may also be connected to other surfaces of the combination of the main body 22 and the base 60, such as a surface opposite the surface having the recess 23.

In this invention, other modifications may be made. For example, a balancing member may be bonded by means of adhesive to a position of surfaces of the main body chosen on the basis of the characteristics of the imbalanced torque detector. One of the sensing coils 26 and 27 may be omitted. Furthermore, one of the exciting coils 24 and 25 may be omitted.

It should be noted that the torque detectors of this invention can be used in various systems, such as a power steering system in which boosted steering force depends on torque on the steering shaft, or an automatic transmission in which engagement and disengagement of a clutch depends on torque on the transmission shaft.

What is claimed is:

1. A torque detector for a shaft including ferromagnetic material comprising:
   (a) an exciting coil unit including fixed cores;
   (b) an a. c. generator electrically connected to the exciting coil unit for supplying alternating current to the exciting coil unit;
   (c) a sensing coil unit including fixed cores electromagnetically coupled by flux to the exciting coil unit via the ferromagnetic material of the shaft for sensing an electrical signal induced across the sensing coil unit, the magnitude of which varies as a function of torque on the shaft; and
   (d) means including a balancing member separate from said fixed cores providing an electromagnetically interactive mass having a variable location in the flux coupling the exciting coil unit to the sensing coil unit for adjusting the electrical signal to zero when no torque is applied to the shaft.

2. The torque detector of claim 1 wherein the balancing member is made of ferromagnetic material.

3. The torque detector of claim 1 wherein the balancing member is made of electrically conductive material.

4. The torque detector of claim 1 wherein said balancing member includes a segment which is removable to zero-adjust the electrical signal.

5. The torque detector of claim 1 wherein the balancing member is movable to zero-adjust the electrical signal.

6. A magnetostrictive-type torque detector comprising:
   (a) a pair of first and second U-shaped cores disposed perpendicular to each other;
   (b) at least one exciting coil wound on the first core;
   (c) at least one sensing coil wound on the second core;
   (d) a main body made of electrically-insulating and non-magnetic material and holding all the cores and the coils; and
   (e) means including a balancing member mounted on the main body and separate from said cores providing an electromagnetically interactive mass having a variable location in the flux coupling the exciting coil to the sensing coil for adjusting magnetic flux running through the sensing coil.

7. The magnetostrictive-type torque detector of claim 6 wherein the balancing member is made of ferromagnetic material.

8. The magnetostrictive-type torque detector of claim 6 wherein the balancing member is made of electrically conductive material.

9. The magnetostrictive-type torque detector of claim 6 wherein a segment of the balancing member is removable to adjust the magnetic flux.

10. The magnetostrictive-type torque detector of claim 6 wherein the balancing member is movable to adjust the magnetic flux.

* * * * *